United States Patent
Junqua et al.

(10) Patent No.: US 7,064,652 B2
(45) Date of Patent: Jun. 20, 2006

(54) MULTIMODAL CONCIERGE FOR SECURE AND CONVENIENT ACCESS TO A HOME OR BUILDING

(75) Inventors: Jean-Claude Junqua, Santa Barbara, CA (US); Philippe Morin, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 261 days.

(21) Appl. No.: 10/237,758

(22) Filed: Sep. 9, 2002

(65) Prior Publication Data
US 2004/0046641 A1     Mar. 11, 2004

(51) Int. Cl.
G05B 19/00     (2006.01)
G10L 11/00     (2006.01)
G10L 17/00     (2006.01)

(52) U.S. Cl. .................... 340/5.84; 340/5.52; 704/246; 704/273

(58) Field of Classification Search ............... 340/5.82, 340/5.83, 5.84, 5.52, 5.53; 713/186, 202; 382/116; 704/273
See application file for complete search history.

(56) References Cited

U.S. PATENT DOCUMENTS

| | | | |
|---|---|---|---|
| 5,142,604 A | 8/1992 | Lee | |
| 5,430,827 A | 7/1995 | Rissanen | |
| 5,612,994 A | 3/1997 | Chen | |
| 5,774,859 A | 6/1998 | Houser et al. | |
| 6,219,639 B1 | 4/2001 | Bakis et al. | |
| 6,246,987 B1 | 6/2001 | Fisher et al. | |
| 6,256,737 B1* | 7/2001 | Bianco et al. | 713/186 |
| 6,424,249 B1* | 7/2002 | Houvener | 340/5.82 |
| 6,681,205 B1* | 1/2004 | San Martin et al. | 704/273 |
| 2003/0163739 A1* | 8/2003 | Armington et al. | 713/202 |

OTHER PUBLICATIONS

SecurPBX—Voice Verification, http://www.otg.ca/Products/P9711_VVOV.htm, printed on Feb. 13, 2002.

* cited by examiner

Primary Examiner—Brian Zimmerman
Assistant Examiner—Clara Yang
(74) Attorney, Agent, or Firm—Harness, Dickey & Pierce, PLC

(57) ABSTRACT

An improved method is provided for enrolling with a resource security system. The method includes: providing an access code to a system user; accessing the resource security system using the access code; prompting the user to input a biometric feature which identifies the user; capturing a biometric feature associated with the user; and associating the captured biometric feature with the identity of the user for subsequent verification. The method further includes subsequently granting access to the secured resource based on biometric feature data input by the user.

25 Claims, 4 Drawing Sheets

MULTIMODAL CONCIERGE FOR SECURE AND CONVENIENT ACCESS TO A HOME OR BUILDING

BACKGROUND OF THE INVENTION

The present invention relates generally to a resource security system, and more particularly, to an improved automated enrollment process for a resource security system.

Door access systems allow authorized persons to gain access to an apartment complex, a home, or a secure area of a building. Such access is traditionally achieved via a key, a magnetic card, a personal identification number, or an intercom call to a person already in the building. Many of these methods present security flaws and inconveniences to either the users or the building manager. For instance, keys and magnetic cards can be lost, forgotten, stolen or illegally duplicated, while PIN numbers can be easily forgotten, annoying to enter on a keypad and/or spied upon by bystanders.

More recently, door access systems have been developed that grant access based on a biometric feature associated with the person requesting access. However, such systems have typically not employed a user-friendly means for enrolling new users. In addition, such system have not provided access to administrative functions associated with the system. Therefore, it is desirable to provide a resource security access system which addresses these and other shortcomings of the conventional technology.

SUMMARY OF THE INVENTION

In accordance with the present invention, an improved method is provided for enrolling with a resource security system. The method includes: providing an access code to a system user; accessing the resource security system using the access code; prompting the user to input a biometric feature which identifies the user; capturing a biometric feature associated with the user; and associating the captured biometric feature with the identity of the user for subsequent verification. The method further includes subsequently granting access to the secured resource based on biometric feature data input by the user.

In another aspect of the present invention, a method is provided for administering user access to a secure resource based on biometric features associated with the system user. The method includes: enrolling a primary user with a resource security system that is operable to control access to the secure resource; subsequently granting the primary user access to administrative functions of the resource security system based on a biometric feature associated with the primary user; and employing the administrative functions to enroll a secondary user with the resource security system.

For a more complete understanding of the invention, its objects and advantages, refer to the following specification and to the accompanying drawings.

DETAILED DESCRIPTION OF THE PREFERRED EMBODIMENTS

Figure 1:
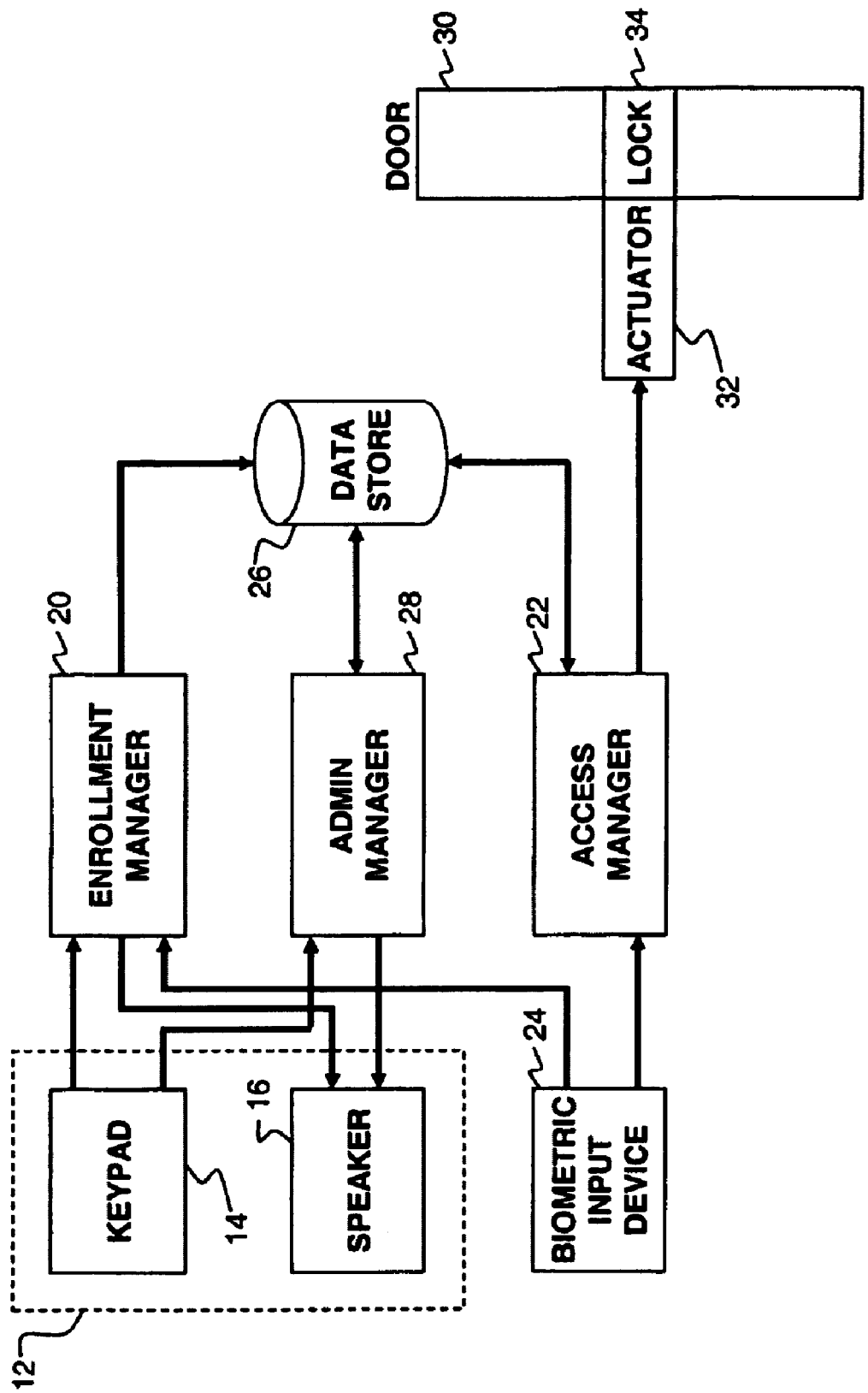
FIG. 1 is a block diagram depicting an exemplary resource security system in accordance with the present invention.

FIG. 1 illustrates an exemplary resource security system 10 in accordance with the present invention. The resource security system 10 is generally comprised of a user interface 12, an enrollment manager 20, an access manager 22, a biometric input device 24 and a biometric data store 26. The user interface 12 is further defined to include at least one input device 14 and at least one output 16. In one embodiment, the input device 14 is a keypad and the output device is a speaker. However, it is envisioned that other types of input and/or output devices, such as a microphone, a keyboard, a touch screen, a magnetic card reader, an LCD display, a fingerprint sensor, or a camera, are within the scope of the present invention.

In operation, the resource security system 10 controls access to a secure resource, such as a secure area of a building. For illustration purposes, the access manager 22 is shown controlling access to a door 30 residing in the building. Specifically, the access manager 22 is connected to an actuator 32 which is in turn operatively connected to one or more locks 34 associated with the door 30. While the following description is provided with reference to controlling access to a door, it is readily understood that the broader aspects of the present invention are applicable to other types of secure resources.

Figure 2:
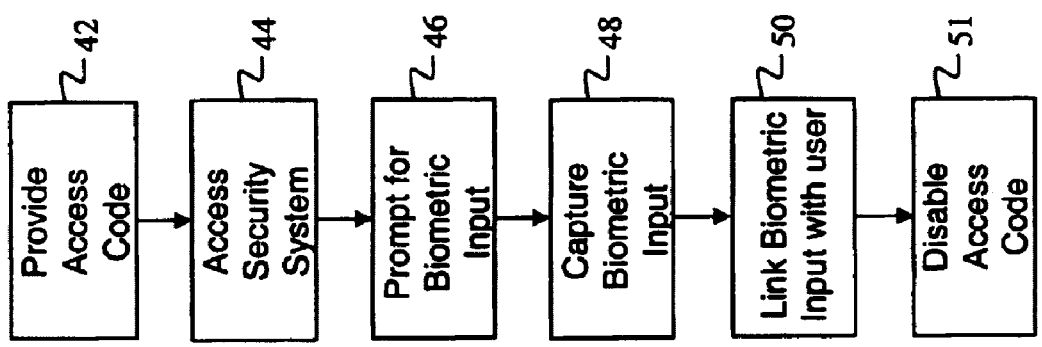
FIG. 2 is a flowchart illustrating an improved method for enrolling a system user with the resource security system in accordance with the present invention.

In accordance with the present invention, an improved method is provided for enrolling a user with the resource security system 10. Referring to FIG. 2, the user is initially provided at step 42 with an access code to the resource security system 10. The access code is preferably an alphanumeric password which may be input using the input device 14 of the system. In one embodiment, the access code is a unique identifier which has been previously associated with the user. Alternatively, the access code may be a generic identifier that is provided to more than one system subscriber. In either case, the access code is used at step 44 to gain access to the enrollment manager 20 of the resource security system. It is understood that access to the system is contingent upon the access code being verified against a list of approved access codes.

Alternatively, the access code may be encoded on a magnetic card provided to the user. In this case, the access code is input when the user swipes the card through a magnetic card reader associated with the system, thereby gaining access to the enrollment manager 20. It is envisioned that other techniques for inputting an access code into the system are also within the scope of the present invention.

In response to receiving the access code, the enrollment manager 20 initiates an automated enrollment process. The enrollment process begins by prompting the user to provide a biometric feature as shown at step 46. To accomplish this task, it is readily understood that an applicable dialogue may be carried out between the user and the user interface 12 of the system. One or more biometric features which identify the user are then captured at step 48 by the biometric input device 24.

In a preferred embodiment, the system uses a text-dependent voice authentication technique. Thus, the biometric feature is voice data (e.g., a voiceprint) captured by a microphone. However, it is readily understood that text independent authentication is also within the scope of the present invention. Alternatively, it is readily understood that biometric features can be used alone or in combination to authenticate user access; other types of biometric features may include (but is not limited to) fingerprints, signatures, retinal prints, and facial bone structure.

Preferably, the captured voice data is in the form of a predetermined password or phrase. However, one of the drawbacks of this type of technique is that the amount and variability of data captured during the enrollment process (i.e., training) may be quite small. Therefore, it is envisioned that the enrollment manager 20 is further configured to enrich the voiceprint models for a given user.

To generate more variability during enrollment, the user could be prompted with artificial utterances and asked to duplicate the artificially induced variation. Alternatively, additional utterances may be synthetically generated and subsequently used for training the authentication models. This is done by artificially modifying such parameters as pitch, speaking rate, noise level and amount of reverberation as is well known in the art.

Similarly, the captured voiceprint models may be enriched by the enrollment manager 20. Voice models can be enriched using adaptation as is known in the art. The motivation behind the adaptation mechanism is that it is difficult to build extremely robust voiceprint models from the data obtained during a single enrollment session. The adaptation scheme may be conducted in a supervised manner (e.g., at the user's request as part of the administrative tool suite) or in an unsupervised manner (e.g., by capturing additional data while the system is being used based on a relatively high confidence score). Adaptation data is collected at various time intervals and therefore allows the system to estimate more appropriately the statistical distributions (i.e. means and variances) of the existing elements composing the voice model and to add new elements to extend the coverage of the voice model. Training repetitions can be used to generate new voice models using previously trained models. For example, if a dynamic time warping system is used, the new model may be constructed from an average of previously trained models and new training repetitions. Alternatively, a previous voice model may be retained and a new voice model can be trained using the new training repetitions. In this instance, multiple voice models may be stored for each user.

The captured biometric feature data is then linked to or associated with the identity of the user at step 50. In the case of a unique, pre-assigned access code, information identifying the user (e.g., name, address, social security number, employee identification number, etc.) may have been captured and stored at the time the access code was provided to the user. Thus, the biometric feature data may be linked via the access code to the identity of the user. In the case of a generic access code, the enrollment manager 20 may be further adapted to request and receive additional identifying information for the user. In either case, the biometric feature data is stored in a data store 26 for subsequent processing. Upon expiration of some predefined time period or upon successful enrollment of the user, it is envisioned that the access code may be disabled at step 51, thereby minimizing any unauthorized access to the system.

The user preferably gains access to the secured resource using the captured biometric feature data. Typically, access will require only a single biometric modality. To enhance verification accuracy, the system may require additional input from the user as further explained below. The addition input may be in the form of same or different biometric modality and/or a non-biometric modality (e.g., keyboard). However, it is important to note that access should be designed to facilitate user convenience and user acceptance of the system. Specifically, minimal dialog interactions should be required to gain access. In a preferred embodiment, a hands-free speaker verification approach is employed. It is understood that a tradeoff exists between user convenience and increased security.

Subsequent to enrollment, biometric feature data may be input at any time to the biometric input device 24. In the preferred embodiment, a motion detector may be placed proximate to the door 30. When motion is sensed near the door, a motion signal is sent to the access manager 22. The access manager 22 in turn enables the biometric input device 24 (e.g., a microphone) to receive input. Alternatively, a button may be used to enable the biometric input device 24. In the case of a speech-enabled input device, it is also envisioned that a wordspotting or other beginning of speech detection technology may be used to detect a user's intent to interact with the system.

Figure 3:
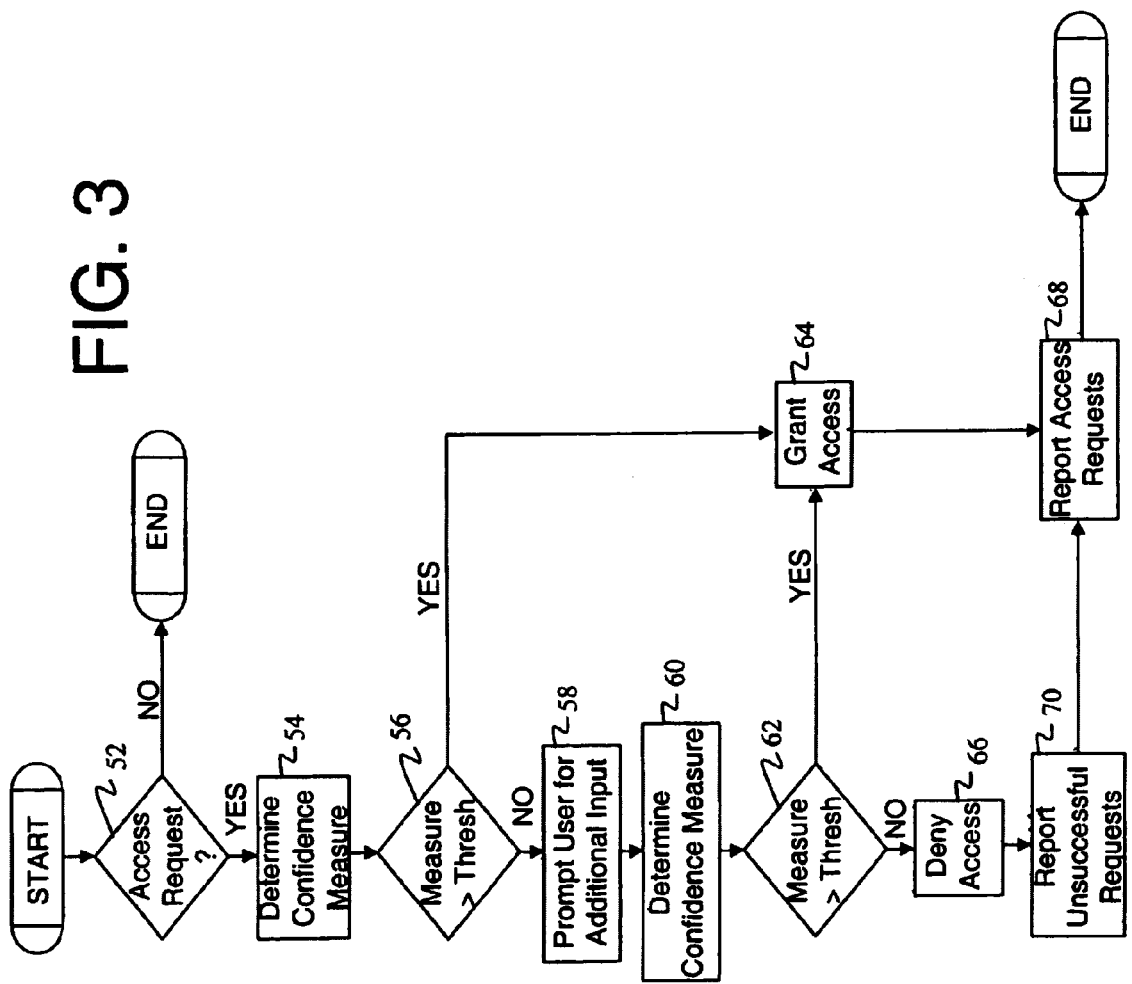
FIG. 3 is a flowchart illustrating an exemplary verification process which may be implemented by the resource security system.

Upon receipt of captured biometric feature data, the access manager 22 implements a set of authorization rules for granting or denying user access to the secured resource. An exemplary verification process as implemented by the access manager 22 is further described in relation to FIG. 3. It is to be understood that only the relevant steps of the methodology are discussed, but that other software-implemented instructions may be needed to control and manage the overall operation of the system.

First, a determination is made at step 52 as to whether the user desires to interact with the system. Access will be granted to users who input biometric feature data that closely correlates to one of the stored data entries. At step 54, input biometric feature data is compared to stored biometric feature data residing in the data store 26. It is readily understood that a confidence measure may be computed and then used as the basis for comparison. In the preferred embodiment, speaker identification and/or verification techniques may be used to compute a confidence measure for input voice data. The confidence measure is a measurement of the certainty that the speaker is one of the previously authorized persons as is well known in the art.

The confidence measure is then compared to a first predefined threshold value at step 56. When the confidence measure exceeds the threshold level, the user is granted access to the secured resource as shown at 64. When the confidence measure is less than or equal to the threshold level, the system may prompt the user at step 58 to provide additional input to enhance verification accuracy. For instance, the user may be required to provide additional voice data. The additional voice data is then used to compute a second confidence measure at step 60. However, it is envisioned that the second confidence measure may also be based on a different biometric modality and/or a non-biometric modality.

The second confidence measure is then compared to a second predefined threshold value at step 62. When the second confidence measure exceeds the threshold level, the user is granted access to the secured resource as shown at 64. It is readily understood that the set of authorization rules may embody other criteria which need to be met before access is grant to a particular user. In the preferred embodiment, the access manager 22 grants access by providing control signals to the actuator 32, thereby unlocking the lock 34 associated with the door 30. Upon successful user authentication, it is further envisioned that access manager 22 may be operable to deliver user-specific information, such as a message from a delivery person about a delivery package or a message from the building manager.

Conversely, when the second confidence measure is less than or equal to the threshold level, the user is denied access to the secured resource at step 66. Alternatively, the user may be prompted for additional biometric or non-biometric input, such that user access is based on one high confidence measure or a combination of confidence measures from several access attempts. Information associated with each access request is recorded at step 68. Optionally, unsuccessful access requests may be reported at step 70 to persons overseeing the secured resource and/or law enforcement officials.

In another aspect of the present invention, an enrolled user may use biometric features to gain access to administrative functions of the resource security system. Of particular interest, a primary user may grant access to secondary users based on their existing registration with the security access system. For instance, a parent who rents an apartment may be considered the primary user of a resource security system that controls access to their apartment building. In this instance, the parent may desire to grant access to other members of their family, such a spouse or a child, who reside in the apartment. Similarly, a resident of an apartment may wish to grant access to a house guest who will be staying at the apartment on a temporary basis. In this instance, the access may only be granted for a pre-defined time period corresponding to the guest's visit. It is readily understood that the invention may be suitable for other such applications.

Figure 4:
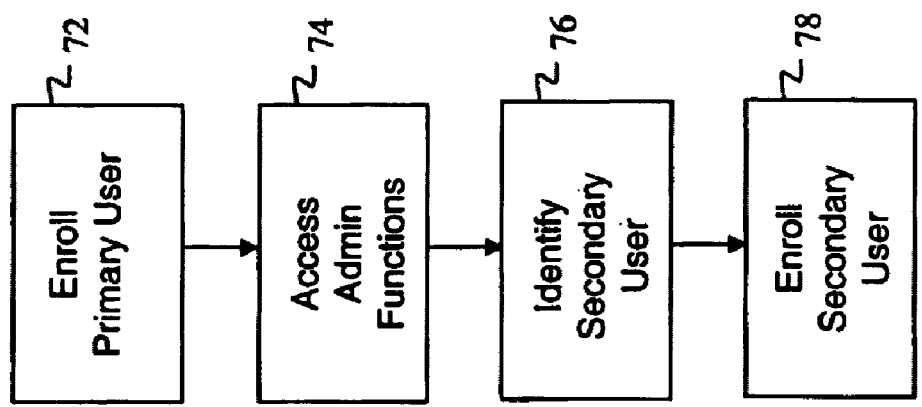
FIG. 4 is a flowchart illustrating an exemplary method for administering secondary user access to a secure resource.

An exemplary method for administering secondary user access to a secure resource is shown in FIG. 4. First, a primary user is enrolled at step 72 with the resource security system that is operable to control access to the secure resource. In a preferred embodiment, the primary user is enrolled using the automated enrollment process described above. However, it is envisioned that the primary user may be enrolled using other known enrollment procedures.

Next, the primary user gains access to the administrative functions provided by the resource security system based on a biometric feature as shown at step 74. In operation, the access manager 22 verifies the primary user's access. Once verified, the access manager 22 passes control to an administrative manager 28. The primary user is then able to perform various administrative functions through interaction with the administrative manager 28.

To perform administrative functions, the administrative manager 28 is configured to carry out appropriate dialogue sessions with the primary user or subsequently enrolled secondary users. For instance, to enroll a secondary user, the primary user is initially prompted at step 76 to provide identifying information for the secondary user, such as name of the secondary user and their relation to the primary user. The secondary user is then enrolled at step 78. The secondary user may be immediately enrolled. Alternatively, the primary user may be provided an access code which will enable the secondary user to enroll with the system at a later time. In either case, the secondary user is prompted to input biometric feature data. Captured biometric feature data from the secondary user is in turn linked to or associated with the identifying information for the secondary user. In addition, profile information for the secondary user is also linked preferably in a hierarchical manner with profile information for the primary user. It is envisioned that the administrative manager 28 may cooperatively interact with the enrollment manager 20 to accomplish enrollment of a secondary user.

Due to the hierarchical relationship, a primary user may restrict the access granted to a secondary user. For instance, a receptionist or office manager may grant access to a mail delivery person who regularly delivers to the building. In this instance, the mail delivery person's access may be limited to normal business hours, such as 8 a.m. to 5 p.m. Monday through Friday. While the above description is provided with reference to enrolling secondary users, it is readily understood that other administrative functions, such as changing voice passwords, providing additional enrollment data, adding secondary users related to the primary user, establishing restricted access periods for secondary users, providing message delivery and recording services for registered user or deletion of secondary users, are also within the scope of the present invention.

The foregoing discloses and describes merely exemplary embodiments of the present invention. One skilled in the art will readily recognize from such discussion, and from accompanying drawings and claims, that various changes, modifications, and variations can be made therein without departing from the spirit and scope of the present invention.

The invention claimed is:

1. A method for enrolling with a resource security system, comprising:
   providing an access code to a system user;
   accessing the resource security system using the access code;
   prompting the user to input a voice biometric feature which identifies the user;
   capturing voice biometric feature data associated with the user;
   inducing variations in the voice biometric feature data associated with the user by synthetically generating additional utterances, including artificially modifying one or more parameters of the voice biometric feature data, wherein the parameters are selected from pitch, speaking rate, or amount of reverberation;
   and associating the captured voice biometric feature data and the variations of the biometric feature data with the identity of the user for subsequent verification.

2. The method of claim 1 further comprises subsequently granting access to a secured resource based on biometric feature data input by the user, including:
   receiving a voice biometric feature input by the user;
   making an initial attempt to verify the identity of the user based on the voice biometric feature;
   only if the initial attempt fails, prompting the user to induce variations in the voice biometric feature data associated with the user;
   only if the initial attempt fails, making a subsequent attempt to verify the identity of the user based on the variations of the biometric feature data; and
   granting access to the secured resource based on success of either the initial attempt or the subsequent attempt.

3. The method of claim 2, wherein subsequently granting access further includes prompting the user to provide additional voice data that is varied only if an attempt to verify the identity of the user based on the first voice biometric feature fails.

4. The method of claim 1 wherein the step of providing an access code further comprises determining identifying information for the user and associating the access code with the identifying information for the user.

5. The method of claim 4 wherein the step of associating the captured biometric feature data further comprises linking the captured biometric feature data to identifying information for the user based on the input access code.

6. The method of claim 1 wherein the step of providing and access code further comprises providing the user with an object having the access code encoded thereon.

7. The method of claim 1 wherein the step of accessing the resource security system further comprises entering the access code into a keypad associated with the resource security system.

8. The method of claim 1 wherein the step of prompting the user further comprises providing at least one of an audible or visual instruction to the user.

9. The method of claim 1 further comprising capturing non-voice biometric feature data associated with the user and associating the non-voice biometric feature data with the identify of the user for subsequent verification and wherein the non-voice biometric feature associated with the user may be selected from the group comprising fingerprints, signatures, retinal prints, and facial bone structure.

10. The method of claim 1 further comprises generating voiceprint models from the voice data which are used to identify the user.

11. The method of claim 10 further comprises prompting the user to provide additional voice data that is varied by at least one of pitch, speaking rate, noise level or reverberation from the first voice data and enriching the voiceprint models for the user based on the additional voice data.

12. The method of claim 1 further comprises disabling the access code upon successful enrollment of the user, thereby minimizing any unauthorized access to the system.

13. The method of claim 1, wherein synthetically generating additional utterances includes artificially modifying pitch parameters of the voice biometric feature data.

14. The method of claim 1, wherein synthetically generating additional utterances includes artificially modifying speaking rate parameters of the voice biometric feature data.

15. The method of claim 1, wherein synthetically generating additional utterances includes artificially modifying amount of reverberation parameters of the voice biometric feature data.

16. A resource security system, comprising:
a user interface adapted to receive an access code from a user;
an enrollment manager adapted to receive the access code and operable, in response to receiving the access code, to prompt the user to input a voice biometric feature which identifies the user; and
biometric input devices, including a voice biometric input device operable to capture voice biometric feature from the user, the enrollment manager being further adapted to receive the voice biometric feature data from the biometric input device and operable to induce variations in the voice biometric feature data by synthetically generating additional utterances, including artificially modifying one or more parameters of the voice biometric feature data, wherein the parameters are selected from pitch, speaking rate, or amount of reverberation and associate the voice biometric feature data and the variations in the voice biometric feature data with the user.

17. The resource security system of claim 16 further comprises an access manager adapted to receive an access request which includes input voice biometric feature data from the voice biometric input device and operable to grant access to a secured resource based on the input voice biometric feature data.

18. The resource security system of claim 17 wherein the enrollment module is further operable to store identifying information for the user and biometric feature data for the user in a data store associated with the system.

19. The resource security system of claim 18 wherein the access manager is further operable to access stored biometric feature data residing in the data store and compare input biometric feature data with the stored biometric feature data in the data store, thereby assessing an access request from a user.

20. The system of claim 17, wherein said access manager is adapted to prompt the user to provide additional voice data that is varied only if an attempt to verify identity of the user based on the voice biometric feature fails.

21. A method for administering user access to a secure resource based on biometric features associated with the system user, comprising:
enrolling a primary user with a resource security system, the resource security system being operable to control access to the secure resource;
subsequently granting the primary user access to administrative functions of the resource security system based on a biometric feature associated with the primary user;
employing the administrative functions to enroll a secondary user with the resource security system, including recording a voice biometric feature and inducing variations in the voice biometric feature by synthetically generating additional utterances, including artificially modifying one or more parameters of the voice biometric feature data, wherein the parameters are selected from pitch, speaking rate, or amount of reverberation;
granting the secondary user access to a secured resource, including:
(a) initially employing the voice biometric feature when making an initial attempt to verify identity of the secondary user;
(b) in response to success of the initial attempt, granting the secondary user access to the secured resource;
(c) in response to failure of the initial attempt, subsequently employing the variations in the biometric feature when making a subsequent attempt to verify identity of the secondary user; and
(d) in response to success of the subsequent attempt, granting the secondary user access to the secured resource based on the variations in the biometric feature.

22. The method of claim 21 wherein the step of enrolling a primary user further comprises:
providing an access code to the primary user;
accessing the resource security system using the access code;
prompting the primary user to input a biometric feature which identities the primary user;
capturing biometric feature data associated with the primary user; and
associating the captured biometric feature data with an identity of the primary user for subsequent verification.

23. The method of claim 21 wherein the step of employing the administrative functions further comprises:
prompting the primary user to provide identifying information for the secondary user;
prompting the secondary user to input a biometric feature which identifies the secondary user;
capturing biometric feature data associated with the secondary user; and associating the captured biometric feature data with the identity of the secondary user for subsequent verification.

24. The method of claim 23 further comprises providing the primary user with an access code which may be used by the secondary user to enroll with the system.

25. The method of claim 21, wherein granting the secondary user access to a secured resource further includes:

(e) in response to failure of the initial attempt, prompting the secondary user to provide additional voice data that is varied.

* * * * *